Figure 2:
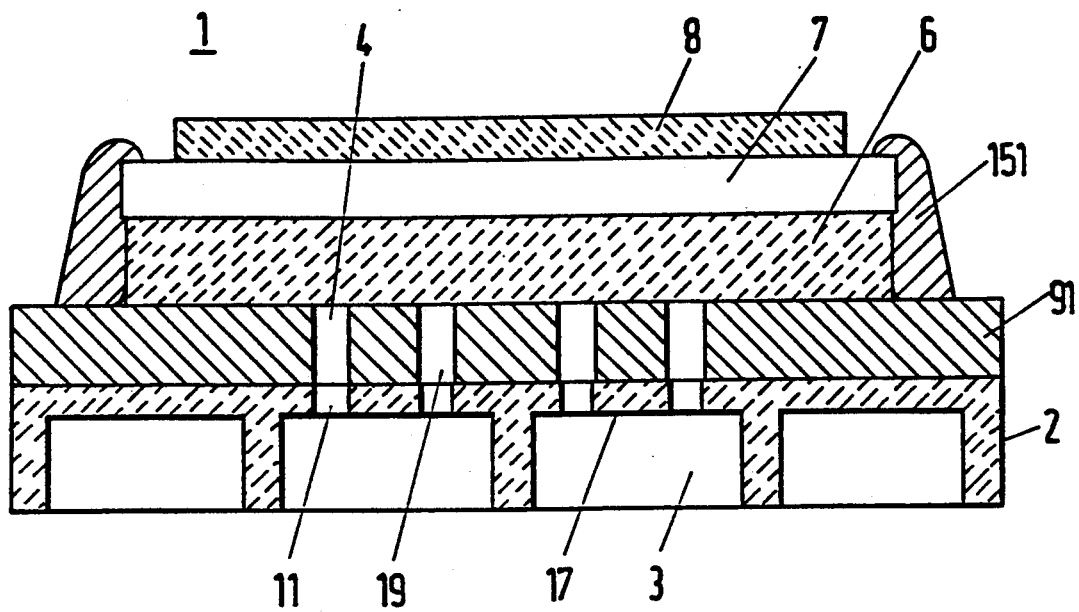

United States Patent [19]

Rohr et al.

[11] Patent Number: 5,192,334
[45] Date of Patent: Mar. 9, 1993

[54] METHOD FOR MECHANICALLY CONNECTING HIGH-TEMPERATURE FUEL CELLS TO A FUEL CELL SUPPORT

[75] Inventors: Franz J. Rohr, Abtsteinach; Andreas Belzner, Heidelberg; Heinz Stadelmann, Schrobenhausen, all of Fed. Rep. of Germany

[73] Assignee: ABB Patent GmbH, Mannheim, Fed. Rep. of Germany

[21] Appl. No.: 877,860

[22] Filed: May 4, 1992

[30] Foreign Application Priority Data

May 4, 1991 [DE] Fed. Rep. of Germany ....... 4114644

[51] Int. Cl.$^5$ .............................................. H01M 8/00
[52] U.S. Cl. ................................... 29/623.5; 427/115; 429/30; 429/36
[58] Field of Search ........................... 29/623.1, 623.5; 429/30, 35, 123, 36; 427/115, 282; 101/114, 129; 156/60; 228/901

[56] References Cited

U.S. PATENT DOCUMENTS 4,781,996  11/1988  Toriya et al. ........................ 429/36
4,861,345  8/1989  Bowker et al. ..................... 29/623.1
4,938,833  7/1990  Kaufman ........................ 429/36 X Primary Examiner—Anthony Skapars
Attorney, Agent, or Firm—Herbert L. Lerner; Laurence A. Greenberg

[57] ABSTRACT

The method is used for producing a gas-tight mechanical connection between at least one prefabricated fuel cell having a fixed electrolyte disk with opposed main surfaces and anode and cathode electrodes applied to the opposed main surfaces, and a ceramic fuel cell support on which the at least one fuel cell is disposed. A nickel layer is applied to the fuel cell support by screen printing, for mechanically connecting the fuel cell to the support, for tapping current from the cathode electrode and as a current connection for an electrical connection to further fuel cells. The fuel cell is laid on the freshly printed nickel layer on the fuel cell support to form a fuel cell system. The fuel cell system is sintered with the imposition of a slight mechanical pressure upon the fuel cell, by initially performing the sintering for approximately one hour in air at a temperature of approximately 400° C. and subsequently in a nitrogen atmosphere at a temperature of approximately 1150° C.

12 Claims, 1 Drawing Sheet

METHOD FOR MECHANICALLY CONNECTING HIGH-TEMPERATURE FUEL CELLS TO A FUEL CELL SUPPORT

The invention relates to a method for producing a gas-tight mechanical connection between at least one prefabricated fuel cell which has a fixed electrolyte disk with anode and cathode electrodes attached to opposed main surfaces, and a ceramic fuel cell support on which at least one fuel cell is disposed.

The method is employed in the field of manufacture of high-temperature fuel cell batteries, the mode of operation of which is described in German Published, Non-Prosecuted Application DE-OS 39 07 485, among other sources. Modular fuel cell systems that include a ceramic support with fuel cells disposed thereon are used for making fuel cell batteries. In accordance with German Published, Non-Prosecuted Application DE-OS 40 11 506, corresponding to U.S. application Ser. No. 683,262, filed Apr. 10, 1991, fuel cell systems may be produced with the aid of prefabricated fuel cells, which are joined to the support by means of adhesive sintering. As an adhesive, the aforementioned patent application proposes a porous, electrically conductive perovskite mixed oxide, but its limited electrical conductivity can lead to unsatisfactory results in some systems.

It is accordingly an object of the invention to provide a method for mechanically connecting high-temperature fuel cells to a ceramic fuel cell support, which overcomes the hereinafore-mentioned disadvantages of the heretofore-known methods of this general type.

With the foregoing and other objects in view there is provided, in accordance with the invention, a method for producing a gas-tight mechanical connection between at least one prefabricated fuel cell having a fixed electrolyte disk with opposed main surfaces and anode and cathode electrodes applied to the opposed main surfaces, and a ceramic fuel cell support on which the at least one fuel cell is disposed, which comprises:

a) applying a nickel layer being structured in the shape of a frame, for example, to the fuel cell support by screen printing, for mechanically connecting the fuel cell to the support, for tapping current from the cathode electrode and as a current connection for an electrical connection to further fuel cells;

b) laying the fuel cell on the freshly printed nickel layer on the fuel cell support to form a fuel cell system; and c) sintering the fuel cell system with the imposition of a slight mechanical pressure upon the fuel cell, by initially performing the sintering for approximately one hour in air at a temperature of approximately 400° C. and subsequently in a nitrogen atmosphere at a temperature of approximately 1150° C.

In accordance with another mode of the invention, there is provided a method which comprises entirely covering one of the main surfaces of the electrolyte disk with the cathode electrode.

In accordance with a further mode of the invention, there is provided a method which comprises covering a rim of the electrolyte disk and the cathode electrode with a sealing layer of nickel.

In accordance with an added mode of the invention, there is provided a method which comprises placing a reinforcement layer of a perovskite, such as of the LaMO$_3$ type, where M=Mn, Cr, on the cathode electrode for improving conductivity.

In accordance with an additional mode of the invention, there is provided a method which comprises applying a reinforcement layer of a perovskite, such as of the LaMO$_3$ type, where M=Mn, Cr, to the support by screen-printing, besides the nickel layer, during method step a); and joining both the reinforcement layer and the nickel layer to the cathode electrode by sintering, during method step c).

In accordance with yet another mode of the invention, there is provided a method which comprises forming the ceramic fuel cell support in gas-tight fashion with conduits therein in a region covered by the cathode electrode for supplying gas, such as air.

In accordance with yet a further mode of the invention, there is provided a method which comprises covering the cathode electrode with the width of the nickel layer in a peripheral region up to 3 mm wide.

In accordance with a concomitant mode of the invention, there is provided a method which comprises producing the mechanical pressure on the at least one fuel cell during the sintering step with a weight of approximately 500 g for a fuel cell area of approximately 16 cm$^2$.

An advantage of the method according to the invention is that the nickel metal acting as a binder, at the temperatures employed, does not yet form a molten phase. Accordingly, the binder can not migrate into the support. Mechanical strains from differing thermal expansion are absorbed by plastic deformation of the ductile binder. The nickel layer used as the binder moreover serves as an electrical conductor for carrying current from the cathode electrode in a conductor track for electrical connection to other fuel cells. Large-area contact is attained between the cathode and the conductor track acting as a current tap. The internal electrical resistances of the system are especially low. In principle, only a single screen-printing step is necessary. Additional effort for producing the electrical connection of the fuel cells is avoided. The mechanical adhesion of the fuel cells through the nickel layer on the support is especially good.

Other features which are considered as characteristic for the invention are set forth in the appended claims.

Although the invention is illustrated and described herein as embodied in a method for mechanically connecting high-temperature fuel cells to a fuel cell support, it is nevertheless not intended to be limited to the details shown, since various modifications may be made therein without departing from the spirit of the invention and within the scope and range of equivalents of the claims.

The method of operation of the invention, however, together with additional objects and advantages thereof will be best understood from the following description of specific embodiments when read in connection with the accompanying drawings.

Figure 1:
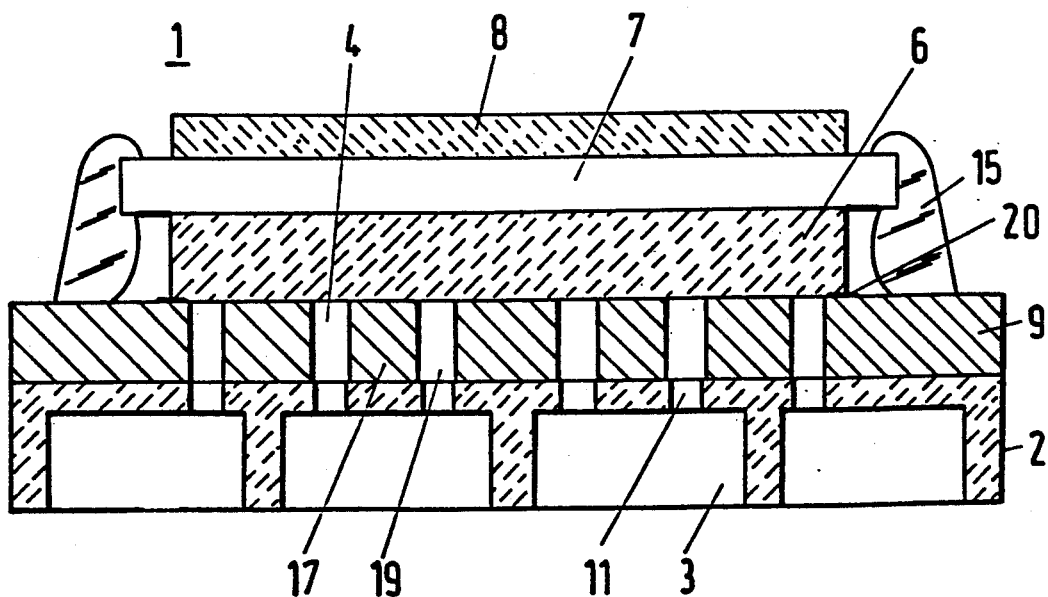

FIG. 1 is a sectional view of a fuel cell array using a method for adhesive sintering which differs from that used in the prior art described above; and FIG. 2 is a view similar to FIG. 1 of a fuel cell array with which further advantageous embodiments of the invention will be described.

Referring now to the figures of the drawing in detail and first, particularly, to FIG. 1 thereof, there is seen a fuel cell array in which a method for adhesive sintering is used and in which a glass ceramic is used as the adhesive. FIG. 1 shows a fuel cell system 1 with a gas-tight ceramic fuel cell support 2. The support 2 has voids 3 for carrying a reaction gas, such as air, from which the gas flows through conduits 11 to a cathode electrode 6. The electrical conductivity of the cathode electrode 6 is improved by a reinforcement layer 17, which has interstices 19 for the gas to flow through to the cathode electrode 6. An electrically conductive connecting layer 9, which is formed of nickel and is structured to suit the desired electrical wiring of fuel cells, is applied to the support 2.

A glass ceramic layer 20, which may be made of A5 glass ceramic made by the firm Schott, for instance, is printed on the connecting layer 9 and acts as a current tap. The glass ceramic layer 20 is printed, for instance, in the form of a 3 mm-wide frame. In order to produce the system 1, a fuel cell 4 is placed on the still-unfired glass ceramic layer 20 and then sintered. During the sintering, a mechanical pressure is exerted upon the fuel cell, for instance by placing a weight on it. In order to seal against a fuel gas, such as hydrogen, that is moved past an anode electrode 8, a glass rim 15 may be provided that covers the rim of the cathode electrode 6 without touching it. The cathode electrode 6 and the bead-like glass rim 15 must be spaced apart from one another, because the glass and cathode material are chemically incompatible. A disk-like electrolyte 7 is disposed between the cathode electrode 6 and the anode 8.

Bonding of the fuel cells 4 to the glass ceramic layer 20 can lead to abnormal thermal strains and to the migration of molten glass ingredients into the support 2 provided with the connecting layer 9. The result may be mechanical destruction of the fuel cell or of the support.

FIG. 2 shows a fuel cell array 1 which is bonded by the method of the invention, with the fuel cell 4 that is joined to the ceramic support 2.

A mechanical connection between the support 2 and the fuel cell 4 is made by means of a nickel layer 91. The cathode electrode 6 of the fuel cell 4, or the bonding point between the cathode electrode 6 and the nickel layer 91, is protected against the entry of hydrogen by a nickel rim 151. The nickel rim 151 also reduces the surface area of the nickel layer 91 that is in contact with hydrogen. Since the nickel rim 151 can be put into direct contact with the cathode 6, the cathode electrode 6 can be constructed with a larger surface area than in the system of FIG. 1, namely with a size being equal to the disk-like electrolyte 7, which is formed of yttrium-stabilized zirconium oxide, for instance. As a result, an advantageously good electrical contact over a large area between the cathode electrode 6 and the nickel layer 91 acting as a current tap, is achieved.

The nickel layer 91 is in contact with the cathode 6 over a relatively wide overlapping region, that is over a peripheral region which is up to 3 mm wide, for instance. With this kind of overlap, and depending on the oxygen partial pressure gradients over the contact distance, a steady-state is established, in which elementary nickel borders as-yet unreduced perovskite. The nickel layer 91 is in fact normally attacked by the oxygen in the air at the high operating temperature. This is counteracted by the fact that the nickel layer 91 is in contact with hydrogen-containing gas from the fuel gas side, and as a result hydrogen diffuses into the nickel layer 91 and thereby protects the layer against corrosion from oxygen.

The necessary overlapping region is ascertained by trial and error in a given application, because an overly large overlapping region reduces the effective surface area of the cathode electrode that is in contact with air.

The fuel cell array with the ceramic support 2 which is shown in FIG. 2, is sintered in gas-tight fashion and has the conduits 11 for the passage through them of the reaction gas, such as air, to the cathode 6. However, the applicability of the bonding method is not limited to gas-tight supports.

The reinforcement layer 17 that is also shown in FIG. 2 with the interstices 19 for improving the conductivity of the cathode electrode 6, should be considered an advantageous feature.

Details regarding the mode of operation of high-temperature fuel cell batteries can be found in the references mentioned initially above, which also include other information on suitable materials for the various components. It is understood that the connecting method is also usable for reverse systems, in which a hydrogen-containing fuel gas is supplied to the cathode 6 through the voids 3 in the support 2, and an oxygen-containing gas is moved past the anode 8.

The proposed method for connecting the fuel cells 4 to the support 2 through a screen-printed nickel layer 91 can be supplemented by applying the reinforcement layer 17, for instance of a perovskite of the $LaMO_3$ type, with M=Mn, Cr, to the support by screen-printing, simultaneously with the nickel layer 91, and subsequently placing the fuel cells on the still-unfired layers and joining them to the cathode by sintering. During the sintering process, the fuel cells are loaded by the application of a weight, of 500 g, for instance, for a fuel cell with a surface area of 4×4 cm.

However, other prefabricated fuel cells that already have a reinforcement layer on the cathode electrodes may be used and the reinforcement layer need not touch the support after the connection operation.

We claim:

1. A method for producing a gas-tight mechanical connection between at least one prefabricated fuel cell having a fixed electrolyte disk with opposed main surfaces and anode and cathode electrodes applied to the opposed main surfaces, and a ceramic fuel cell support on which the at least one fuel cell is disposed, which comprises:
   a) applying a nickel layer to the fuel cell support by screen printing, for mechanically connecting the fuel cell to the support, for tapping current from the cathode electrode and as a current connection for an electrical connection to further fuel cells;
   b) laying the fuel cell on the freshly printed nickel layer on the fuel cell support to form a fuel cell system; and
   c) sintering the fuel cell system with the imposition of a slight mechanical pressure upon the fuel cell, by initially performing the sintering for approximately one hour in air at a temperature of approximately 400° C. and subsequently in a nitrogen atmosphere at a temperature of approximately 1150° C.

2. The method according to claim 1, which comprises structuring the nickel layer in the shape of a frame.

3. The method according to claim 1, which comprises completely covering one of the main surfaces of the electrolyte disk with the cathode electrode.

4. The method according to claim 1, which comprises covering a rim of the electrolyte disk and the cathode electrode with a sealing layer of nickel.

5. The method according to claim 1, which comprises placing a reinforcement layer of a perovskite on the cathode electrode for improving conductivity.

6. The method according to claim 5, which comprises selecting the perovskite of the reinforcement layer to be of the $LaMO_3$ type, where M=Mn, Cr.

7. The method according to claim 1, which comprises applying a reinforcement layer of a perovskite to the support by screen-printing when applying the nickel layer; and joining both the reinforcement layer and the nickel layer to the cathode electrode during the sintering step.

8. The method according to claim 7, which comprises selecting the perovskite of the reinforcement layer to be of the $LaMO_3$ type, where M=Mn, Cr.

9. The method according to claim 1, which comprises forming the ceramic fuel cell support in gas-tight fashion with conduits therein in a region covered by the cathode electrode for supplying gas.

10. The method according to claim 1, which comprises forming the ceramic fuel cell support in gas-tight fashion with conduits therein in a region covered by the cathode electrode for supplying air.

11. The method according to claim 1, which comprises covering the cathode electrode with the width of the nickel layer in a peripheral region up to 3 mm wide.

12. The method according to claim 1, which comprises producing the mechanical pressure on the at least one fuel cell during the sintering step with a weight of approximately 500 g for a fuel cell area of approximately 16 $cm^2$.

* * * * *